United States Patent [19]

Witerski et al.

[11] 4,398,982
[45] Aug. 16, 1983

[54] SPLICED WEB AND METHOD FOR FORMING A SPLICE

[75] Inventors: Peter C. Witerski; Charles W. Pierson, both of Rochester, N.Y.

[73] Assignee: Eastman Kodak Company, Rochester, N.Y.

[21] Appl. No.: 326,791

[22] Filed: Dec. 2, 1981

[51] Int. Cl.³ .................... B65H 69/02; B65H 69/06
[52] U.S. Cl. ............................... 156/157; 156/304.3; 156/304.6; 156/280; 156/502; 428/58
[58] Field of Search ................... 156/157, 159, 304.3, 156/304.4, 304.6, 280, 502; 428/58, 61

[56] References Cited

U.S. PATENT DOCUMENTS

| | | | |
|---|---|---|---|
| 2,751,321 | 6/1956 | Sans | 156/157 |
| 3,650,872 | 3/1972 | McKiernan | 156/304.6 |
| 3,927,233 | 12/1975 | Naidoff | 156/304.3 |
| 3,972,762 | 8/1976 | Kawahara et al. | 156/304.3 |
| 3,991,243 | 11/1976 | Biddell | 156/304.3 |
| 4,269,647 | 5/1981 | Verkinderen et al. | 156/157 |

OTHER PUBLICATIONS

Snogren, R., "Space-Age Bonding Techniques-Part 2 Adhesive Bonding" *Mechanical Eng.* vol. 92, No. 5, (May 1970), pp. 33-38.

*Primary Examiner*—Edward C. Kimlin
*Assistant Examiner*—E. K. Wine
*Attorney, Agent, or Firm*—Steve W. Gremban

[57] ABSTRACT

A spliced web and method for splicing web end portions together for minimizing splice-induced disturbance of a liquid composition continuously coated onto the face side of the spliced web during a coating operation. Splicing strips are applied overlying the face and opposite sides of the web end portions to form a sandwich, and the sandwich is subjected to heat and pressure. The splicing strip on the face side fuses with and impregnates the web end portions and forms slight trailing and leading ramp surfaces of gradually decreasing thickness which blend smoothly with the face side of the web for minimizing coating disturbances. The other splicing strip contains fibers which are embedded into or adhere to the opposite side of the web end portions to provide tensile strength to the spliced web.

10 Claims, 5 Drawing Figures

U.S. Patent  Aug. 16, 1983  4,398,982
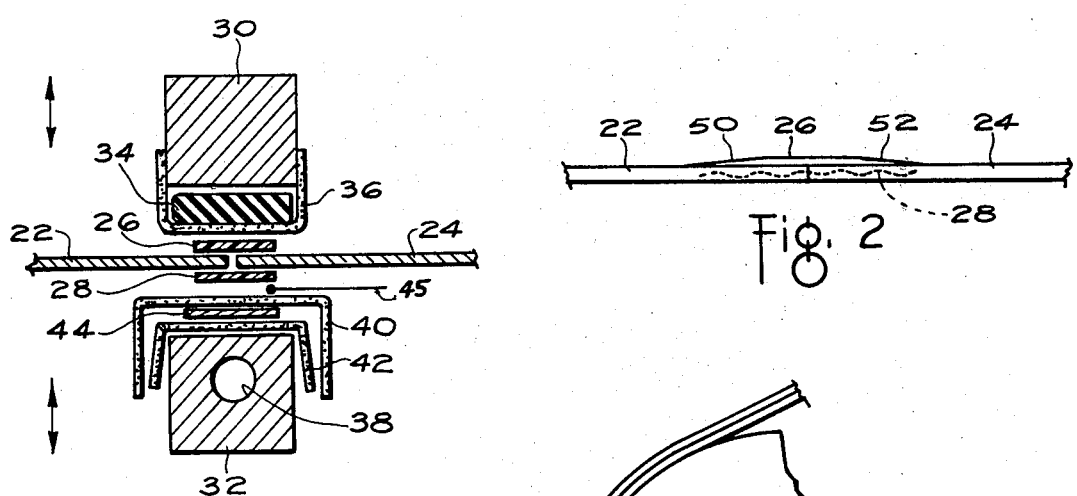
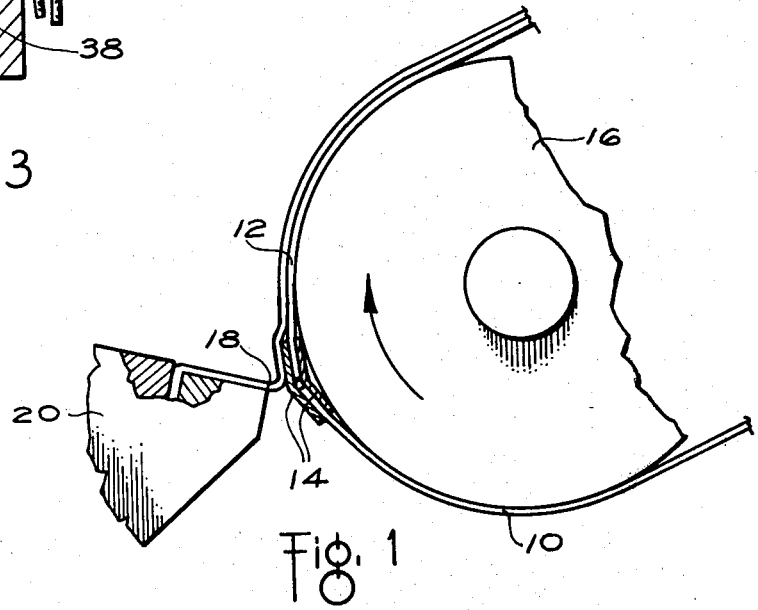
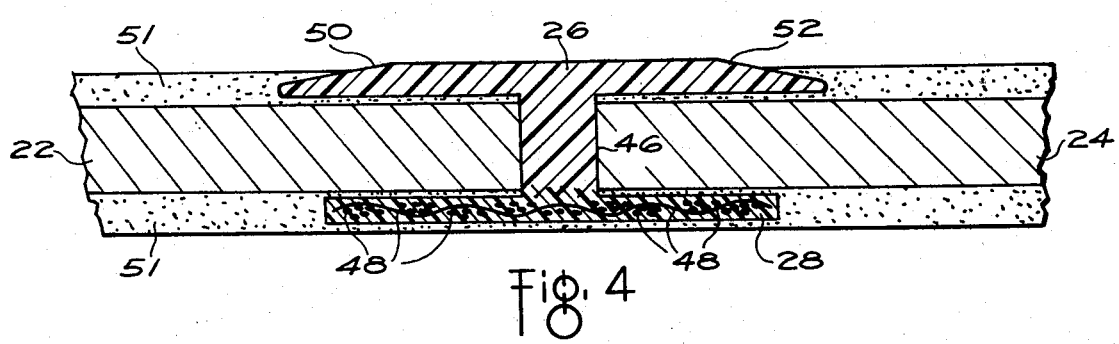
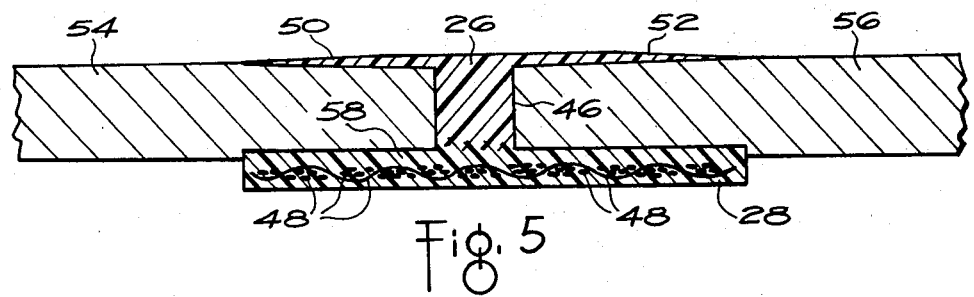

SPLICED WEB AND METHOD FOR FORMING A SPLICE

BACKGROUND OF THE INVENTION

1. Field of the Invention

This invention relates in general to the art of coating, and in particular to the application of liquid coating compositions to a spliced web. More specifically, this invention relates to an improved spliced web and method for forming a splice which minimizes coating disturbances caused by the splice during coating of the spliced web with a liquid composition.

2. Description of the Prior Art

A longstanding problem in the art of coating web materials with liquid coating compositions is disturbance of the coating operation that is caused by abrupt changes in web thickness, and hinging or creasing of the web end portions along the butt line at splice locations in the web. The problem is particularly acute in the photographic art in which it is very common to make use of the bead coating technique to coat a web of photographic support material with liquid photographic coating compositions, such as radiation-sensitive gelatin silver halide emulsions utilized to form imaging layers or other hydrophilic colloid compositions employed in subbing layers, inter-layers, antistatic layers, protective overcoats layers, and so forth. In the bead coating process, one or more liquid layers are fed into a coating bead which is maintained in bridging relationship between the surface of a moving web and a lip of a coating hopper which is closely spaced a fixed distance therefrom, and the surface of the web is continuously moved across and in contact with the coating bead to pick up the one or more liquid layers. The coating bead utilized in this method of coating is very susceptible to disturbance by the splice, which is typically a butt-splice in which web portions in contiguous end-to-end relationship are joined together by a splicing web. A face-side splice is generally utilized, that is, the splicing tape is on the surface of the web to which the coating composition is applied, since this generally results in less disturbance than a back-side splice.

Disturbance of the coating bead by splices causes serious defects in the coating. The problem occurs even at low or moderate coating speeds but becomes especially severe at high coating speeds. Among the difficulties commonly encountered are the tendency of the coating bead to skip or break into distinct areas, causing regions of excessively heavy coating and regions of no coating on the support. A further serious problem is the trapping of air bubbles at the trailing edge of the splicing tape. (The terms "leading edge" and "trailing edge" of the splicing tape are used herein to distinguish the two edges in relation to the direction of travel of the web, with the "trailing edge" being the edge on the upstream side and the "leading edge" the edge on the downstream side.) Trapped air bubbles cause problems in a number of ways. For example, they may become lodged in the coating bead or on the lip of the coating hopper and cause a longitudinal line or streak in the coating which can render worthless substantial quantities of the coated material. Where the coating operation involves coating at two or more stations in succession, bubbles introduced into the coating at one station can be sheared off at a subsequent station and thereby cause the formation of lines or streaks. Moreover, bubbles in the coating can result in incomplete drying so that at the first instance where the coated layer comes into contact with a roller, there is a tendency for coating composition to adhere to the roller, resulting in a coating defect referred to as coating solution transfer or "track-off." If the coating bubbles harden, and the web is later wound into a roll, the hardened bubbles can cause undesirable impressions to be generated in the succeeding web convolutions. Such undesirable impressions can also be formed in the web convolutions of a roll as a result of excessive splice thickness. If the coating bubbles do not harden entirely, but remain tacky, they can act as an adhesive when the web is wound into a roll causing an adjacent web convolution to adhere to the convolution containing the splice. When the web is unwound from the roll, the convolutions adhere together resulting in undesirable web separation or "tear-off." The undesirable defect referred to as "tear-off" can also occur where a splice, due to hinging, for example, strikes the hopper lid causing the web to separate or tear off.

The leading edge of the splicing tape is not ordinarily an important factor in causing coating disturbances. Such disturbances are primarily associated with the trailing edge. In particular, the trapping of air bubbles occurs at the trailing edge as the coating bead passes over the splicing tape and then returns to engagement with the web surface. A major consideration in regard to the extent to which bubbles will be trapped and the coating operation will be disturbed is the thickness of the splicing tape and the magnitude of the vertical drop at the trailing edge of the splicing tape, that is, the distance from the surface of the splicing tape to the adjacent web surface. In general, the greater the extent of this vertical drop the greater the degree of disturbance of the coating process.

Another factor that is important in causing coating disturbances is the hinging of the web end portions along the butt line as the web end portions travel around a roller adjacent the lip of the coating hopper. The web end portions hinge along the butt line into a generally shallow, inverted, V-shaped configuration as the web passes around the roller. The hinged V-shaped portion abruptly changes the distance between the web surface and the lip of the hopper as the hinged portion passes thereby resulting in a disturbance of the coating operation.

There have been many efforts made in the past to alleviate the problems associated with coating over splices, and to reduce the extent to which disturbance of the coating operation takes place. For example, a simple method for reducing coating disturbances caused by splices is described in U.S. Pat. No. 3,518,141 and British Pat. No. 1,243,663. In this method, the trailing edge of the splicing tape and the adjacent web surface is covered with a film of water prior to the coating operation and the coating composition is applied before the water dries. Certain other techniques for reducing coating disturbances at splices are described in U.S. Pat. No. 3,531,362. The techniques described involve coating the trailing edge of the splicing tape and the adjacent web surface with a hydrophobic material, feathering or beveling the trailing edge of the splicing tape, and filling in the transition from the tape to the web surface with a suitable filler material such as rubber cement. A reduction in coating disturbances caused by splices can also be provided, as described in U.S. Pat. No. 3,916,043, by control of the differential pressure which is maintained to stabilize a coating bead. Thus, the disturbances caused by splices are greatly decreased if the differential pressure is increased to an elevated level just before a splice enters the coating station, is maintained at this level during the time the splice is passing the coating station and for a short time thereafter, and is then reduced to the normal level. Yet another procedure for reducing coating disturbances caused by splices is that described in U.S. Pat. No. 3,972,762 in which a portion of the web is "preworked" so that the web surface immediately upstream of the trailing edge of the splicing tab is at least coplanar with the surface of the splicing tape. Still another technique for reducing coating disturbances caused by splices is described in U.S. Pat. No. 4,172,001. This technique involves placing a thin tape overlying the trailing edge of the splicing tape. The thin tape serves as a ramp between the splicing tape and the surface of the web and introduces only a very small vertical drop at its own trailing edge.

The prior art is further replete with apparatus and methods for butt splicing motion picture film with a minimal increase in film thickness at the splice location. Representative patents include U.S. Pat. Nos. 2,480,794, Waggoner; 3,519,524, Baumbach; and 3,661,667, Gardner et al.

SUMMARY OF THE INVENTION

In accordance with this invention, an improved spliced web and method for making the splice is provided. The spliced web is adapted for continuous coating on its face side with liquid coating composition with reduced spline-induced disturbance of a coating operation. The spliced web comprises first and second preferably fibrous web portions in abutting end-to-end relationship. A first thermoplastic splicing strip of material meltable at one temperature is positioned overlying the face side of the abutting ends of the web portions, and is fused therewith under a predetermined temperature and pressure to splice the web portions together. During fusion, the splicing strip partially flows into the fibers or interstices of the web and into the gap between the abutting ends, and forms small ramp surfaces on the web portions of gradually decreasing thickness at the trailing and leading ends of the splicing strip which blend smoothly with the face side of the spliced web. A second thermoplastic splicing strip containining fibers of a material meltable at a higher temperature than the predetermined temperature is positioned overlying the side of the abutting ends of the web portions opposite the face side. The unmelted fibers of the second splicing strip are embedded into or otherwise secured to the opposite side of the abutting web portions under the predetermined pressure and temperature to splice the web portions together and to provide tensile strength to the spliced web.

Utilization of the first thermoplastic splicing strip on the face side of the web portions in combination with a second thermoplastic splicing strip on the opposite side is a simple, convenient and highly effective way of solving a difficult coating problem. The first splicing strip fuses with the web portions to form slight ramps of gradually decreasing leading and trailing ends which blend smoothly into the face side of the web without substantially increasing the thickness of the web. This results in a substantially flap splice face that greatly reduces splice-induced disturbance of the coating operation. The first splicing strip also flows into the gap between the web end portions and into the fibers surrounding the gap to secure the web end portions together and greatly reduce hinging of the web end portions at the gap or butt line. The first splicing strip is further selected of a synthetic thermoplastic material such as polyethylene that has a surface essentially the same, chemically, as the web face. Consequently, the face side of the splice will accept a liquid coating composition as readily as the web face, thereby resulting in less web waste. In fact, it is possible in some instances to greatly reduce web waste by obtaining web coating over the splice of a quality acceptable for market use. The second splicing strip is selected of a synthetic thermoplastic material such as polyester containing fibers which fuse or melt at a temperature above the temperature at which the first splicing strip melts. The unmelted fibers are partially embedded into the opposite side of the web portions and adhere thereto to provide tensile strength for the spliced web.

BRIEF DESCRIPTION OF THE DRAWINGS

In the detailed description of the invention presented below, reference is made to the accompanying drawings, in which:

FIG. 1 is a schematic segmental side elevational view of a device for continuously coating a liquid composition onto a web, and showing web end portions joined by prior art adhesive splicing tapes whch allow hinging of the web end portions;

FIG. 2 is an enlarged segmental side elevational view of a spliced web in accordance with a preferred embodiment of this invention;

FIG. 3 is a side elevational view in section of a part of an impulse heat sealer for making the spliced web of FIG. 2, and further schematically shows the relative positions of the web end portions and splicing strips prior to the splicing operation;

FIG. 4 is a segmental, highly magnified view in section of a spliced resin coated paper web; and FIG. 5 is a view similar to FIG. 4 of a spliced paper web.

DESCRIPTION OF THE PREFERRED EMBODIMENTS

The present invention is especially useful in the coating of photographic materials and particularly in the utilization of the bead coating method in photographic manufacturing operations. Accordingly, it is described hereinafter with respect to the coating of such materials. However, the invention is broadly useful wherever a spliced web is to be coated with liquid coating composition by a coating method in which the splice can cause disturbances and, accordingly, it can be applied in the manufacture of a wide variety of coated materials.

The bead coating method can be used in applying a single layer of coating composition or it can be used in the simultaneous application of two or more layers. It has been described in considerable detail in the prior art, for example, in U.S. Pat. Nos. 2,681,294; 2,761,417; 2,761,418; 2,761,419 and 2,761,791. Spliced webs which have been modified to reduce coating disturbances by the use of heat sealable splicing strips, as described herein, can be advantageously employed in single layer or multiple layer bead coating operations carried out under a wide variety of conditions. They are particularly advantageous in high speed coating operations involving a web speed of at least 100 centimeters per second.

As illustrated in FIG. 1, web portions 10 and 12 ar arranged in contiguous end-to-end relationship and prior art adhesive splicing tapes 14 are securely bonded to the surfaces of each web portion to form a spliced web. Spliced webs of this type are very commonly utilized for the coating of photographic supports. Such splices are commonly referred to as butt-splices and the web portions are described as abutting even though they do not necessarily touch one another, and ordinarily are positioned such that there is a narrow gap between them, for example, a gap of about one millimeter. Since it is desired to avoid having the web ends overlap one another and since there is great difficulty in cutting and positioning the web ends with such accuracy that they just touch over the full width of the web, the formation of a splice with a narrow gap between the web ends is ordinarily the more easy and convenient procedure. Since splicing tapes are wide in relation to the narrow gap, the fact that there is a gap between the web ends and that this gap may not be of exactly the same magnitude across the full width of the web creates no difficulties relative to the splice. However, when the spliced web is conveyed over a coating roll 16, the web portions 10, 12 can hinge along the gap area or butt line as seen in FIG. 1. Such hinging abruptly alters the distance between the lip 18 of a coating hopper 20 and the face of the spliced web to which a coating is applied, and disturbs the coating operation. Such coating disturbances are enhanced by the hinging action of the web portions 10, 12, and by the abrupt vertical drop between the coating surface of the tape 14 and the adjacent face of the spliced web at the trailing and leading ends of the tape.

With reference to FIG. 2, a preferred embodiment of the improved spliced web of this invention is schematically shown in enlarged form which solves the aforementioned problems caused by splice hinging and vertical drop, and in addition presents a splice surface that is readily coatable. The spliced web comprises web portions 22, 24 of resin coated paper arranged in abutting relationship, and having a first thermoplastic splicing strip 26 of approximately two thousandths of an inch thickness overlying and fused into the face side of the abutting web portions, and a second thermoplastic splicing strip 28 of approximately four thousandths of an inch thickness overlying and embedded into the opposite side of the abutting web portions. First splicing strip 26 is preferably formed of any suitable thermoplastic material or equivalent, such as polyethylene or hot melt adhesive, which is meltable at a temperature around 105° C. Another possible material from which strip 26 could be formed is a gelatin, for example. The second splicing strip 28 is preferably formed of any suitable thermoplastic material or equivalent, such as a polyester fabric, which is woven, or a polyester interfacing, which is non-woven. A representative polyester fabric is known on the market as Kortex (trademark) 9000 fabric, and a representative polyester interfacing is commercially available as Pellon (trademark) interfacing. The polyester fabric and interfacing contains fibers, which are meltable at a temperature considerably higher than the temperature at which the splicing strip 26 melts, and hence remain unmelted during the splicing operation.

With reference to FIG. 3, reciprocally movable upper and lower heat sealer jaws 30, 32 of an impulse heat sealer of any commercially available type, not shown, are disclosed for heat sealing a sandwich comprised of the splicing strips 26, 28 and abutting web portions 22, 24 to form the spliced web of FIG. 2. The jaws 30, 32 are preferably formed from aluminum. Upper jaw 30 has a silicone rubber back-up pad 34, and a buffer band 36 of woven fiberglass impregnated with Teflon (trademark) encircling the pad and secured to the jaw. Lower jaw 32 has a water cooling channel 38, and a pair of overlapped buffer bands 40, 42 of woven fiberglass impregnated with Teflon (trademark) resting on the block for insulating a nichrome heater 44 interposed therebetween.

To form a spliced web, second splicing strip 28 is placed on buffer band 40, the abutting ends of web portions 22, 24 are placed on strip 28, and first splicing strip 26 is placed over the abutting web portions 22, 24 to form a sandwich between the heater jaws 30, 32, as shown in exploded relation in FIG. 3. The heater jaws are maintained by any suitable equipment at a temperature preferably between 90° C. and 115° C. for the polyethylene and polyester materials used. To form a spliced web, the heater jaws are closed by any suitable means, not shown, to compress the sandwich under a pressure of substantially 34 kilograms (75 pounds) per square inch. When the pressure buildup is complete, the heater is energized at approximately 750 watts to raise the temperature of the sandwich to a peak temperature of approximately 110° C. (230° F.). At this temperature and pressure, the resin coating of the web portions 22, 24 and polyethylene of the first splicing strip 26 melt together and partially impregnate the fibers in the paper. A thermocouple 45 senses the jaw temperature and turns off the power to the heater at 110° C. The jaws 30, 32 remain closed until the temperature drops to approximately 88° C. (190° F.). At this stage, first splicing strip 26 has been shaped into a substantially flattened, ramp member in which the polyethylene completely fills the gap 46 along the butt line of the web portions, and partially impregnates the paper fibers surrounding the gap. The ramp member has gradually decreasing trailing and leading ramp ends 50, 52 respectively which blend smoothly into melted areas of resin 51 on the face side of the web portions as best seen in greatly magnified form in FIG. 4. The second splicing strip 28 may contain some meltable material which melts, but the fibers 48 therein do not melt and are compressed and embedded by the pressure into melted areas of resin 51 on the web portions 22, 24, to form a connective link between the web portions for providing tensile strength to the spliced web.

With reference to FIG. 5, to splice papers 54, 56 without resin coatings, the same sealing technique described heretofore in relation to resin coated papers is used wth one modification. With reference to FIG. 3, a third thermoplastic or equivalent splicing strip 58 similar to first splicing strip 26 is interposed between the inner surface of second splicing strip 28 and lower surfaces of the web portions, and/or between the outer surface of strip 28 and the buffer band 40. The added third strip 58 melts during the splicing operation as seen in FIG. 5 and essentially functions as a glue which impregnates the fibers of the paper and strip 28 to bond the strip fibers 48 to the paper web portions 54, 56 as shown in greatly magnified form in FIG. 5. Alternatively, the second splicing strip or fabric 28 could be impregnated with a thermopolastic material such as a hot seal adhesive in lieu of the third strip 58.

The aforementioned web sealing technique may also be used to splice phototypesetting papers. For such an application, the first splicing strip 26 has a pigment added thereto such as $TiO_2$ to cause the first splicing strip to match the color and surface texture of the face side of the paper. A spliced web of this type could be coated over the splice, and the product sold to customers in rolls containing splices.

The improved spliced web of this invention can be composed of any fibrous material or equivalent suitable for coating in web form. For example, the web can be composed of any photographic paper support material. Suitable supports include, for example, paper; baryta-coated paper; and paper coated with polyolefins, as exemplified by polyethylene and polypropylene, for example.

The improved spliced web of this invention can be advantageously utilized in coating operations carried out at low, intermediate or high speeds. It is particularly useful in high speed bead coating operations used in the manufacture of photographic materials. In such processes the web speed employed is at least 100 centimeters per second and may be substantially greater than this, such as web speeds of up to 600 centimeters per second and higher. A preferred range of web speeds for high speed coating is from about 150 to about 500 centimeters per second.

Coating compositions utilized in coating the novel spliced web described herein can be aqueous compositions or compositions in which the liquid medium is organic or a mixed aqueous-organic system. The coating compositions can take the form of solutions, dispersions or suspensions.

The invention is particularly advantageous in photographic manufacturing operations. It is suitable for use with any liquid photographic coating composition whether applied as a single layer or as part of a multi-layer arrangement which is coated by techniques of simultaneous multi-layer coating and all such compositions as are utilized in the photographic art are intended to be within the term "photographic coating composition" as used herein.

Photographic layers applied with the use of this invention can be radiation-sensitive layers, such as gelatin silver halide emulsion layers, or non-radiation-sensitive layers. For example, subbing layers, pelloid protective layers, filter layers, antihalation layers, etc., are often applied separately and/or in combination and these particular layers are not radiation sensitive. The present invention relates also the application of such layers, and the term "photographic coating composition" as employed herein, is intended to include the compositions from which such layers are formed. Moreover, the invention includes within its scope all radiation-sensitive materials, including electro-photographic materials and materials sensitive to invisible radiation as well as those sensitive to visible radiation. While, as mentioned hereinbefore, the layers are generally coated from aqueous media, the invention is not so limited since other liquid vehicles are known in the manufacture of photographic elements and the invention is also applicable to and useful in coating from such vehicles.

More specifically, the photographic layers coated according to the method of this invention can contain light-sensitive materials such as silver halides, zinc oxide, titanium dioxide, diazonium salts, light-sensitive dyes, etc., as well as other ingredients known to the art for use in photographic layers, for example, matting agents such as silica or polymeric particles, developing agents, mordants, and materials such as are disclosed in U.S. Pat. No. 3,297,446. The photographic layers can also contain various hydrophilic colloids. Illustrative of these colloids are proteins, e.g., gelatin; protein derivatives; cellulose derivatives; polysaccharides such as starch; sugars, e.g., dextran; plant gums; etc., synthetic polymers such as polyvinyl alcohol, polyacrylamide, and polyvinylpyrolidone; and other suitable hydrophilic colloids such as are disclosed in U.S. Pat. No. 3,297,446. Mixtures of the aforesaid colloids may be used, if desired.

While a presently preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A method of forming a splice in a resin coated paper web to provide a spliced web having a face side that is capable of being continuously coated with a liquid coating composition with reduced splice-induced disturbance of the coating operation, said paper web further having at least the side opposite the face side coated with resin, said method comprising the steps of:
   positioning first and second resin coated paper web portions in abutting end-to-end relationship in which the resin is meltable at a predetermined temperature between about 90° C. to 115° C.;
   applying a first splicing strip of a material meltable at said predetermined temperature in overlying relationship with the abutting ends of the face side of the first and second resin coated paper web portions;
   applying a second splicing strip of a material containing fibers meltable at a higher temperature than said predetermined temperature in overlying relationship with the opposite side of the first and second resin coated paper web portions; and
   subjecting the first and second resin coated paper web portions and overlying first and second splicing strips to a temperature between said predetermined and higher temperatures and to a predetermined pressure to splice the web portions together by melting the first splicing strip for filling the space between the abutting first and second resin coated paper web portions and partially impregnating said web portions, forming slight trailing and leading ramp surfaces of gradually decreasing thickness on the face side of the web portions which blend smoothly with the face side, and melting said resin and embedding the fibers of said second splicing strip into said melted resin on the opposite side of the resin coated paper web portions.

2. A method according to claim 1 wherein said first splicing strip is formed from a polyethylene material.

3. A method according to claim 2 wherein said first splicing strip has a pigment added thereto causing said first splicing strip to match the color and texture of the resin coated paper web.

4. A method according to claims 1 or 2 wherein said second splicing strip is formed from a polyester material.

5. A method of forming a splice in a paper web to provide a spliced paper web having a face side that is capable of being continuously coated with a liquid coating composition with reduced splice-induced disturbance of the coating operation, said method comprising the steps of:

positioning first and second paper web portions in abutting end-to-end relationship;
applying a first splicing strip of a material meltable at a predetermined temperature between about 90° C. to 115° C. in overlying relationship with the abutting ends of the face side of the first and second paper web portions;
applying a second splicing strip of a material containing fibers meltable at a higher temperature than said predetermined temperature in overlying relationship with the side of the adjacent ends of the first and second paper web portions opposite the face side;
positioning a third splicing strip of material meltable at substantially said predetermined temperature in register with one side of said second splicing strip; and
subjecting the first and second paper web portions and overlying first, second and third splicing strips to a temperature between said predetermined and higher temperatures and a predetermined pressure to splice the web portions together by melting the first splicing strip for filling the space between the abutting first and second paper web portions and partially impregnating said web portions, forming slight trailing and leading ramp surfaces of gradually decreasing thickness on the face side of the paper web portions which blend smoothly with the face side, embedding the fibers of said second splicing strip into the opposite side of the paper web portions, and melting the third splicing strip for adhering the fibers to the paper web portions.

6. A method according to claim 6 wherein said first and third splicing strips are formed from a polyethylene material.

7. A method according to claim 5 wherein said first splicing strip has a pigment added thereto causing said first splicing strip to match the color and texture of the paper web.

8. A method according to claim 5 wherein said second splicing strip is formed from a polyester material.

9. A method according to claim 5 wherein said third splicing strip comprises a hot melt adhesive.

10. A method according to claim 5 wherein said first splicing strip is formed from a polyethylene material, said second splicing strip is formed from a polyester material, and said third splicing strip comprises a hot melt adhesive.

* * * * *